United States Patent [19]
Sigl et al.

[11] Patent Number: 5,209,329
[45] Date of Patent: May 11, 1993

[54] AUTOMATIC LOCKING BRAKE

[75] Inventors: Alfred Sigl, Sersheim; Wolf-Dieter Jonner, Beilstein-Schmidhausen, both of Fed. Rep. of Germany

[73] Assignee: Robert Bosch GmbH, Stuttgart, Fed. Rep. of Germany

[21] Appl. No.: 877,649

[22] Filed: May 1, 1992

Related U.S. Application Data

[63] Continuation-in-part of Ser. No. 460,942, Feb. 28, 1990, Pat. No. 5,129,496.

[30] Foreign Application Priority Data

Aug. 28, 1987 [DE] Fed. Rep. of Germany ....... 3728709

[51] Int. Cl.⁵ .................................................. B60K 41/20
[52] U.S. Cl. .................................. 192/1.23; 192/1.35; 303/96
[58] Field of Search ................... 192/1.23, 1.33, 1.35; 303/96

[56] References Cited

U.S. PATENT DOCUMENTS

| | | | |
|---|---|---|---|
| 3,664,712 | 5/1972 | Hiscox | 192/1.23 X |
| 4,684,177 | 8/1987 | Ha | 303/100 |
| 4,685,746 | 8/1987 | Matsuda | 303/97 X |
| 4,865,175 | 9/1989 | Hirako et al. | 192/1.33 X |

*Primary Examiner*—Rodney H. Bonck
*Attorney, Agent, or Firm*—Felfe & Lynch

[57] ABSTRACT

When the vehicle speed falls below a predetermined reference speed, the measured vehicle deceleration is used to calculate an extrapolated time when the vehicle will be brought to a complete stop. When the extrapolated time is reached, the brake pressure is automatically applied and maintained until a desired departure is indicated.

4 Claims, 1 Drawing Sheet

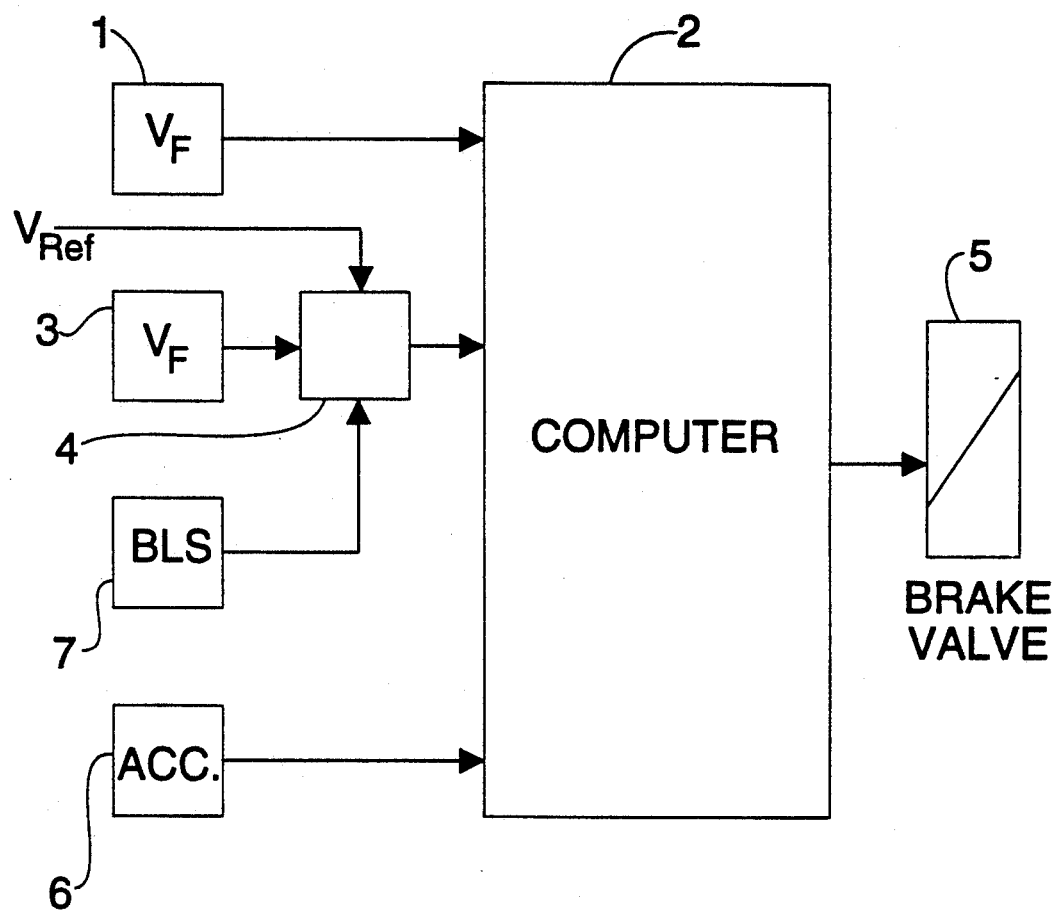

AUTOMATIC LOCKING BRAKE

BACKGROUND OF THE INVENTION

This application is a continuation-in-part of U.S. Ser. No. 07/460,942 filed on Feb. 28, 1990, now U.S. Pat. No. 5,129,496. That application claims priority from PCT International application Ser. No. PCT/EP 88/00732 filed Aug. 17, 1988. U.S. Pat. No. 5,129,496 is specifically incorporated herein by reference.

The invention relates to a brake control system for automatically applying a braking pressure when the vehicle speed drops below a very low speed value and the brake pedal is operated, and maintaining that pressure until the vehicle is driven off again.

U.S Pat. No. 4,684,177 discloses an automatic locking brake during the use of which a valve is activated when operating the brake and the clutch pedal. This valve permits maintaining the applied brake pressure even after the release of the brake. When the clutch pedal is released followed by an immediate pressing of gas pedal, the pressure is reduced. The use of a speed signal ensures that there is no pressure increase while the vehicle is in motion.

U.S. Pat. No. 4,684,177 discloses gradually increasing the brake pressure in case the vehicle speed is zero and the brake pedal is pressed down.

SUMMARY OF THE INVENTION

According to the invention, when the vehicle speed reaches a small reference speed value, the measured vehicle deceleration is used to calculate when the vehicle will come to a complete stop while maintaining this deceleration. At this calculated point in time, the brake pressure is applied automatically and maintained until a desired departure, as may be indicated by applying the accelerator. This calculating and supplying procedure can be made dependent upon operation of the brake by the operator.

BRIEF DESCRIPTION OF THE DRAWING

The sole figure is a diagram of the system according to the invention.

DETAILED DESCRIPTION OF THE PREFERRED EMBODIMENT

Referring to the figure, the vehicle deceleration $\dot{v}_F$ is measured with a sensor 1 and the measured value is fed to computer 2. The vehicle speed $v_F$ is determined in a unit 3, for example from inputs from wheel speed sensors (not shown). As is well known, this may actually be a reference speed which approximates the vehicle speed.

The vehicle speed $v_F$ is compared to a reference speed $v_{Ref}$, e.g. 10 km/h, in a comparator 4. When the vehicle speed $v_F$ falls below the reference speed $v_{Ref}$ the comparator 4 supplies a signal to the computer 2. The computer 2 then calculates, starting from the reference speed $v_{Ref}$ and the measured vehicle deceleration $\dot{v}_F$, the point in time at which the vehicle comes to a halt, if the vehicle deceleration remains constant.

In the embodiment shown, this output from the comparator 4, and thus the extrapolation by the computer 2, is also dependent upon operation of the brake, as indicated by the brake light signal (BLS) from input 7.

When the extrapolated time point is reached, the computer 2 actuates a valve 5 which applies sufficient pressure to the brakes to stop the vehicle and keep it stopped.

When it is again desired to move the vehicle, as may be indicated by a sensor 6 which detects operation of the accelerator pedal, the computer 2 supplies a signal to valve 5 which releases the pressure. Valve 5 has at least two positions, one for connection to a pressure source, another for pressure relief.

Variations of the above described scheme are possible. For example, the brake light signal may be fed from input 7 directly to computer 2, and may also be used to determine when departure is desired.

The foregoing is exemplary and not intended to limit the scope of the claims which follow.

We claim:

1. System for automatically locking the brakes of a vehicle said system comprising
   means for determining the deceleration $\dot{v}_F$ of the vehicle,
   means for determining the speed $v_F$ of the vehicle,
   means for comparing $v_F$ to a reference speed $v_{Ref}$,
   means for extrapolating a time when the vehicle will be brought to a complete stop from said speed $v_F$ and said deceleration $\dot{v}_F$, said extrapolating being done when said vehicle speed $v_F$ falls below said reference speed $v_{Ref}$, and
   means for automatically applying pressure to the brakes when said time is reached and maintaining said automatically applied pressure until a desired departure.

2. System as in claim 1 further comprising means for determining when the brakes of the vehicle have been applied by an operator, said extrapolating being done when said brakes are applied by the operator.

3. System as in claim 1 wherein said vehicle has an accelerator applied by an operator, said system further comprising
   means for determining when said accelerator has been applied, and
   means for releasing said pressure when said accelerator has been applied.

4. Method for automatically locking the brakes of a vehicle. said system comprising
   determining the deceleration $\dot{v}_F$ of the vehicle,
   determining the speed $v_F$ of the vehicle,
   comparing $v_F$ to a reference speed $v_{Ref}$,
   extrapolating time when the vehicle will be brought to a complete stop from said speed $v_F$ and said deceleration $\dot{v}_F$, said extrapolating being done when said vehicle speed $v_F$ falls below said reference speed $v_{Ref}$, and
   automatically applying pressure to the brakes when said time is reached and maintaining said automatically applied pressure until a desired departure.

* * * * *